US007578447B2

(12) United States Patent
Crum

(10) Patent No.: US 7,578,447 B2

(45) Date of Patent: Aug. 25, 2009

(54) MECHANICALLY ABLATED BUSINESS COMMUNICATION ASSEMBLY PREPARED FROM DISCONTINUOUS SUBSTRATES

(75) Inventor: Jesse D. Crum, Fort Scott, KS (US)

(73) Assignee: Ward/Kraft, Inc., Fort Scott, KS (US)

( * ) Notice: Subject to any disclaimer, the term of this patent is extended or adjusted under 35 U.S.C. 154(b) by 660 days.

(21) Appl. No.: 11/237,529

(22) Filed: Sep. 28, 2005

(65) Prior Publication Data

US 2007/0069033 A1 Mar. 29, 2007

(51) Int. Cl.
*G06K 19/00* (2006.01)

(52) U.S. Cl. ....................................... 235/487; 235/380

(58) Field of Classification Search ................. 235/380, 235/375, 487, 486

See application file for complete search history.

(56) References Cited

U.S. PATENT DOCUMENTS

2005/0186547 A1 * 8/2005 Yang et al. .................. 434/308

* cited by examiner

*Primary Examiner*—Karl D. Frech

(74) *Attorney, Agent, or Firm*—Harcy Weissenberger

(57) ABSTRACT

The present invention is directed toward a substantially planar business communication assembly that has one or more mechanically ablated recesses or depressions which are created through the use of rotary bit a portion of the form assembly. The assembly preferably includes first and second portions that are joined to one another to form a composite construction. The business form is typically provided with an ablated depression in one of the two portions. The depression has a depth that is sufficient such that when a removable element is placed within the depression the surface of the removable element is substantially planar with the surface of at least one of the surfaces of the portions used to make up the assembly.

17 Claims, 4 Drawing Sheets

MECHANICALLY ABLATED BUSINESS COMMUNICATION ASSEMBLY PREPARED FROM DISCONTINUOUS SUBSTRATES

CROSS-REFERENCES TO RELATED APPLICATIONS

None.

FIELD OF THE INVENTION

The present invention relates to a substantially planar; discontinuous business form construction which is preferably created from distinct substrates, at least one of which has been provided with one or more removable elements such as cards, labels or tags. The form construction is desirably a composite form having at least first and second discrete portions or segments that are selected from different materials, one of which carries one or more removable elements and the other of which provides an information carrying portion. The process of providing mechanically ablated areas in the form construction of the present invention permits the manufacturer to create one or more depressions in the assembly that may accommodate various sized structures and shaped pieces as well as a channel enabling the substrates to be secured together in a planar arrangement.

The form construction of the present invention is produced in such a manner so that when a series of the forms with the removable elements are placed into a stack, such as in a tray that supplies forms to a printing station or a laser printer, there is no significant pad lean arrangement. That is, the stack of forms retains a relatively square, rectangular or cube shape, as opposed to one having a sloped configuration, a high end and a low end, due to the substantially equivalent differential thicknesses between the two portions of the construction and the area joining the two substrates together. In addition, the form construction of the present invention enables the feeding of a form along the long side or in the landscape position. The form construction of the present invention also has the additional benefit of reducing the surface affinity between the forms.

BACKGROUND OF THE INVENTION

There are currently a plethora of office products, business form constructions and other stationery items that are available in the market today and yet with this inordinately large selection of offerings and permutations, there remains a continuing need to develop new products due to changes in technology, societal trends, diversification and new information handling needs of businesses and consumers alike.

However, while printed products, such as pieces and other assemblies that are intended to be used in business communications, can be delivered in a wide variety of formats, constructions and configurations, the manufacturing of such diversified products may be unattainable by most producers of such products, particularly smaller sized manufacturers. Typically, one of the most significant limiting factors for a manufacturer in being able to produce a particular construction or expand product capabilities is the available equipment the manufacturer has on hand to generate such printed pieces. Such forms handling machinery can be quite expensive and in addition the equipment may require some customization before the equipment can be integrated into a particular manufacturing processes. Thus, egress into new product categories may simply not be possible due to cost constraints.

Information carrying structures such as business forms with removable cards, tags and labels have long been used to convey information to the holder, presenter or recipient of the business form. When utilizing removable cards, such cards include but are not limited to insurance, medical, identification (ID cards), membership applications, admissions, tickets, collections, special events, credit or debit cards, temporary passes and the like.

One traditional means used to deliver cards includes placing the card in a carrier that had cut out notches to receive two or more comers of the card and then deliver the card through the mail, by use of a courier or by such other means in order to place the card in the possession of the intended recipient. However, while effective in delivering the card to the end user, the process of assembling the mailing can be cumbersome, in that it requires the carrier to be printed and then to subsequently cut notches in the carrier to create areas to hold the comers of the card and then, finally placing of the card in the carrier. Next, the carrier is typically folded and then usually placed in an envelope prior to mailing the card to the recipient. In addition to being a somewhat cumbersome manufacturing process, the process itself can be expensive, in that it requires a number of pieces, a supply of cards, carriers and envelopes. Thus, there has been a continuing trend to move away from such processes and reduce the number of separate components and steps required to prepare such a business form construction.

Another means by which to deliver cards, arose out of the need to reduce such processing complexities as discussed above, includes simply affixing the card to the top surface or uppermost portion of the sheet of paper or the like. This product configuration eliminated the need to die cut notches in the carrier to create an area to receive the card as well as the step of having to align and place the comers of the card within the cut out area of the carrier.

In the construction described above, one where the card rides on top of the surface or face of the substrate, the card is normally affixed to the sheet of paper through the use of a spot adhesive that would hold the card in place during handling and transport, yet allow the card to be readily removed by the recipient. Alignment was not a critical concern and hence processing speeds improved. However, this construction, while eliminating some of the drawbacks associated with the above mentioned arrangement of putting a card into a carrier assembly, still suffered from unforeseen difficulties and created new problems in that the card was placed on the surface of the sheet of paper which then created a raised area that often resulted in jamming of the printer or feeding apparatus when attempting to image or process the paper substrate with the card attached. Unfortunately, while this particular construction resulted in manufacturing efficiencies, it also created difficulties for the end users as such product configurations had to be carefully or even gingerly fed through the printer, again slowing distribution to the end user and resulting in significant frustration of the end user or printer of the form construction.

In a still further effort to overcome the above-mentioned problem of differential thicknesses created by the inclusion of the card on the surface of the paper or substrate, manufacturers then sought to create holes, pockets or die cut areas that extended through the particular substrate. The cut outs generally corresponded in size and shape to the card that was to be placed into the receiving area. In such a construction, when the card is placed into a receiving area, the card may not rest above the level of the surface of the paper substrate, but instead could extend below the bottom surface of the sheet of paper as the card was held in position by tape or other means sufficient to secure the card to the carrier. Once again the manufacturer, while solving the problem of having the card extend above the surface of the sheet, faced the problem of alignment and having to carefully position the card within the receiving area.

In addition to alignment, the manufacturer also had to hold and secure the card in the receiving area. As such, and in order to hold the card in place in the carrier, another web of material was affixed over the hole in the form of a patch, a continuous strip that ran edge to edge or segments of material that would hold the card in position, see for instance U.S. Pat. No. 5,403, 236. While effective in over coming the problem with the card being placed on top of the substrate, such a construction then suffered from additional problems.

The addition of the supplemental material over the area of the cut out to receive the card again created a raised portion that extended either below the surface of the paper or alternatively both above and below the surface of the paper, depending upon the thickness of card structure. Again, the construction could still only be fed in a small amount to the printer, as the area of double thickness around the card area created a hump, or a sloped configuration when several card carrying sheets were placed in a stack. This limited the amount of cards that could then be placed in the tray to be fed to the printer or processing equipment.

A still further solution to the above-mentioned dilemma was to create a calendared area or recess in the paper substrate by crushing an area of the paper that corresponded to the size of the card. A card was then placed within the crushed area of the substrate. Such a process generally eliminated the need to apply a patch to hold the card in the area of a cut out into which a card would be inserted; however, this construction still suffers from other drawbacks. Initially, the thickness of the card material was typically more than the thickness of the paper substrate. As such, the top surface of the card would still be above the top surface of the paper substrate leading to an arrangement that still suffered from difficulties in processing the card due to the differential thickness arising out of the card sticking out of the well or recessed area. In addition, the manufacturer still had to accurately align the construction so that it would fit within the area of the recess or well.

Calendaring of materials, particularly fibrous materials also suffers from another draw back, that of expansion due to humidity. The fibers in a calendared sheet or web are still present, they have merely been crushed, and when exposed to increased levels of humidity it is possible for the fibers to expand and thus, the benefit of calendaring is lost. For example, a manufacturing plant in Louisiana will likely have a higher degree of relative humidity when compared for example with a plant in Arizona. Thus, while a calendared construction may work in the Arizona plant due to the low humidity it may suffer from problems in the plant located in a higher humidity area.

Edge calendaring has also been used in certain circumstances such as shown in Holmberg U.S. Pat. Nos. 4,618,520 and 4,447,481 but such processes would again be subject to the difficulties of manufacturing environments.

A still further business form and card construction was then contemplated to eliminate the need to align and place a card, usually plastic, in a well, recess, die cut area, etc. This solution was to simply affix a web of card material, again usually plastic, to the substrate. This enabled the manufacture to die cut the material directly in line with the imaging of the information carrying portion of the construction. However, such constructions, while attractive from a manufacturing perspective did not completely solve the processing of the form construction.

The web of card material still needed to be connected to the portion or web of information carrying material. In one arrangement, one web is affixed or partially juxtaposed directly onto an edge or side of the other portion by adhesive, crimping, mechanical fastening or the like. As expected, however, this arrangement creates a bump in the form and contributes again to processing difficulties in attempting to feed the construction through the printer. Again, such arrangements had to be carefully processed through the printer and only a few forms at a time could be stacked into a feed tray for a printer or processing equipment.

An attempt to resolve the problem of the discontinuous surface area was to place the webs next to or adjacent one another and then place a small strip of material, such as tape to connect the two webs together. While this solved some additional problems for card manufacturers and end users, still other problems persisted. The area covered by the strip of tape creates a zone having a higher thickness than the rest of the configuration. This again creates problems of feeding the construction through the printer. In addition, due to the use of two different types of materials, the card material may also be thicker than the information portion of the substrate and as such when the products are placed into a stack they then again create a sloped arrangement, thus limiting the number of cards that can be placed in a feed tray for a printer.

A still further difficulty encountered by such two part constructions is that the web of card material, typically a plastic or synthetic film, may build up excess static when placed in a stack thus making feeding of the forms difficult as they tend to stick to one another in the tray or other feeding mechanism.

In addition to the foregoing enumerated drawbacks of these prior art constructions, modifications were also attempted with respect to the processing or printing equipment, more specifically to the feed trays, in order to compensate for the pad lean or slope of the stack of products. Such modifications to the feed trays included the insertion of shims under one portion of the form structure, the form having the lesser thickness (that end without the card) in order to facilitate feeding of the forms. This modification led to more exotic configurations of feed trays, including spring loaded and adjustable shims in order to accommodate differing types of form products. However, while the modifications to the equipment appeared to address the problem of pad lean, it nonetheless required the end user or printer to make sure that the appropriate tray, shim, or adjustment had been made to the equipment prior to beginning run of the product. In those situations where the operator forgot to make the equipment change, then the finishing process was subjected to further delays and jamming as indicated above. Moreover, many end users or printers were simply unwilling to make the additional investment in such modified trays.

An additional processing problem also resulted from the use of such prior art constructions. Such constructions, due to the difficulty in feeding the forms, required the forms to be fed in a portrait arrangement into the printer, that is in connection with a form size of 8½" by 11", the 8½" side was fed to the printer first. By feeding the short side of the form into the printer first, the printer, which calculates wear of the print head based on the total running length of the print job, was subjected to additional wear in running a regular pass of product as opposed to being able to run a regular pass of forms when fed in a landscape, or long side first, arrangement through the printer. That is, for example, a group of 100 forms run in the portrait direction would cause more wear on the print head than a group of 100 forms run in the landscape direction. As can be expected, this also resulted in a further delay in processing the forms by the end user or printer.

What is needed therefore, is a business form card combination that overcomes the foregoing difficulties, such as pad lean or sloped stacks, static buildup and other problems so that larger numbers of cards can be placed in a feed tray as well as the problem of bumps or humps in the form construction is mitigated and the cost of manufacture is reduced so that the construction can be produced economically as well as expeditiously.

Publications, patents and patent applications are referred to throughout this disclosure. All references cited herein are hereby incorporated by reference.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Unexpectedly, it has been discovered that a substantially planar sheet for use as a business communication document can be created from discontinuous sheets of material by creating a recessed area by mechanically ablating a surface portion of a sheet, such as by a rotary ablating device. In an assembly utilizing more than one type of substrate material, the sheets may then be joined to one another either by applying a bonding material, such as a tape strip, in a channel area created when recessed areas of the sheets are placed adjacent one another, or alternatively by creating recesses in the surfaces of the sheet that are opposite one another and then fitting the sheets together in an overlapping or tongue and groove type of arrangement.

In one exemplary embodiment, a business communication assembly is described and includes a substantially planar substrate that has a thickness, first and second portions, with each of the portions having first and second transversely extending edges, first and second longitudinally extending sides and top and bottom faces. The first and second portions are placed in an abutting relationship with one another and secured together along one of the first and second transversely extending edges and first and second longitudinally extending sides.

At least one mechanically ablated, shaped depression is formed in the top face of the second portion and the depression is spaced inwardly from each of the first and second transversely extending edges and first and second longitudinally extending sides. The depression has a shape that is formed by mechanical ablation and the depression extends from the top face toward the bottom face but does not penetrate the bottom face of the substrate.

A removable element is provided in connection with the presently described embodiment and is sized and configured to fit substantially within the depression. The removable element has a shape that is substantially equivalent to the shape of the depression. A temporary bonding agent disposed within the depression to temporarily hold the removable element in the depression. The removable element has a top surface such that when the removable element is placed within the depression, the top surface of the card is substantially planar with the top surface of the second portion.

In a still further exemplary embodiment of the present invention, a substantially planar business form assembly and card combination is described and includes a first substantially planar portion that has a thickness, first and second transversely extending edges, first and second longitudinally extending sides and top and bottom faces.

A second substantially planar portion is provided and has a thickness that is substantially equivalent to the thickness of the first portion. The second portion has first and second transversely extending edges, first and second longitudinally extending sides and top and bottom faces. The second portion is placed in an adjacent, abutting arrangement with the first portion along one of the longitudinally extending sides and transversely extending edges. The first portion and the second portion are joined to one another and cooperate to form a business communication assembly.

At least one ablated, shaped depression is provided in connection with the presently described embodiment and the depression is formed in the second portion top face and extends from the top face toward the bottom face but does not go through or break the bottom face. The depression has a shape that is formed by mechanical ablation and has a depth which is less than the thickness of the second portion.

A removable card that is sized and configured to fit substantially within the depression is provided such that a top surface of the card is substantially planar with the top surface of the second portion when the removable card is placed within the depression.

A yet still further exemplary embodiment of the present invention includes a detachable element carrier for communicating business information which has a substantially planar business form with top and bottom faces, a thickness, first and second longitudinally extending edges and first and second longitudinally extending sides. The substantially planar business form has two portions, with at least one of the portions having at least one ablated depression, created by mechanical ablation, that extends from the top face and toward but not through the bottom face. The ablated depression has a size and a shape and a depth that is less than the thickness of the substantially planar business form. The ablated depression has a temporary bonding agent deposited within the depression.

A detachable element has a size that is less than the size of the depression and a shape that is substantially equal to the shape of the depression. The detachable element further includes a top surface and a bottom surface, such that when the detachable element is placed in the depression the top surface of the detachable element will be substantially planar with the top surface of the business form.

In connection with the foregoing embodiments or any one of them, a second depression may be formed by ablating the surface of the substrate with a mechanical ablator having a rotary bit used in removing a portion of the material. The second depression will preferably have the same shape and size as the first depression, but it should be understood that the second depression may have a second or distinct shape from that of the first depression.

The depression will generally extend to a depth that is substantially equal to a thickness of the removable or detachable element and generally no more than about 85% of the thickness of the substrate so that there is sufficient material remaining in the base of the depression to hold the removable or detachable element in position.

The first and second portions may be joined to one another through use of a channel and a strip of bonding material. The channel may also be formed by ablating edge portions of the portions so that when the strip of material is placed into the channel the assembly will retain a substantially planar configuration.

In addition, any of the foregoing embodiments may also include personalized and static printing on one or more surfaces of the substrate. Preferably, personalized printing will be provided on each of the first and second portions as well as the detachable or removable portion. One or more of the portions may preferably also contain static or fixed printing to aid in the use of the business form assembly.

These and other objects of the invention will become clear from an inspection of the detailed description of the invention and from the appended claims.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

Figure 1:
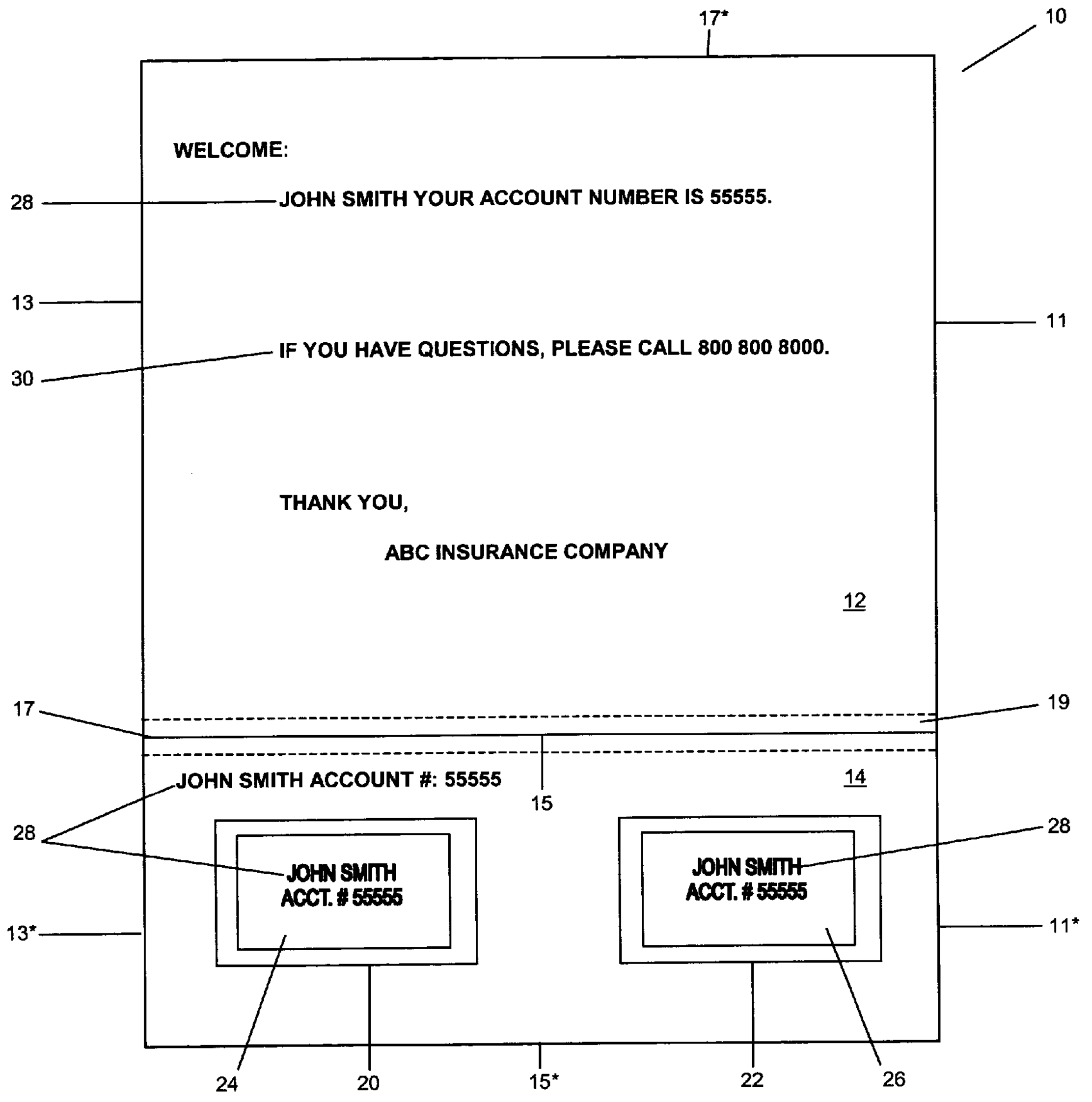
FIG. 1 depicts a front view of the business communication assembly produced in accordance with the present invention.

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

The invention utilizes a rotary device to ablate selected areas of a substrate in order to create appropriately sized recesses. The recesses are sized and configured to receive removable elements such that the removable elements along with the substrate create a substantially planar business communication assembly. While the use of mechanical ablating devices to remove material from a sheet of material is generally known in the metal fabrication arts, the inventors of the instant application were unaware of the use of lasers in the creation of business communication pieces and documents.

The term "removable elements" refers to items such as cards, labels, chips, coins, tickets, tags and the like as well as portions of substrates that have a differential thickness compared with the remainder of the business form to which it is attached, connected or otherwise configured in arrangement therewith and may be removed from the form assembly.

As used herein, the term "business communication piece or document" refers to a substrate that, either alone or in combination with other documents, can convey a particular message, image or provide information about a particular product or service that is available from the provider of such pieces or documents. Business communication documents or pieces can include advertising, sales and marketing collateral and such other items used to convey information on written or imaged form sheets, brochures, presentation folders, informational sheets and combinations thereof.

The term "personalized information" refers to information that is printed or imaged onto a substrate, which is generally variable or unique and which may change from document to document or segment to segment, so as to create a customized message or communication for each recipient. Examples of personalized information may include names, addresses, descriptions, plans, coding, numbering, promotional text, etc. that may have been acquired from the intended recipient through surveys, questionnaires or answers given to various inquiries generated in response to a request for goods or services.

The term "static or fixed" information refers to printed or imaged information that generally does not change from document to document or segment to segment and may include a general description or body of information about particular products, services, places, etc. that may be of interest to the intended recipient and represents a standard message that the manufacturer or supplier wishes to convey to an end user or customer of the offering.

The term "intermediate" as used herein, refers to a product that undergoes one or more processing steps prior to the intermediate reaching a final condition, that of being ready for end use or application. The additional processing steps may include printing, imaging, folding, sealing, separating, cutting, perforating, scoring, adhering and the like. Typically, a product, such as with the present invention, is provided in an intermediate condition so that a user can add or manipulate the intermediate to create the final or desired end product. Thus, in accordance with the present invention, the intermediate segment, for example, could be subject to die cutting or additional printing, such as through ink jetting, over laminating, coating or embossment.

The term "sheets" or "segments" as used herein, refers to sheets, segments, ribbons, strips, pieces, parts, sections, subdivisions and combinations thereof. The sheet or segment provided as an example for the purposes of this specification can be an entire sheet such as 8½"×11", 11"×14", 19"×25" portions of sheets and other known sheet sizes or may be segments, divisions, strips, etc. of such sheets.

It should be understood that the type, shape, number and arrangement of the removable elements is discretionary and any such configuration may be used depending on the needs of the end user or particular application for which the removable elements are intended. As indicated in the FIGURES a side by side arrangement of two cards is provided, or the cards may be a self-laminating construction. The cards or removable elements may be disposed one on top of the other or only a single element may be present. While the card is generally considered to be a "wallet sized" card, one about the standard dimensions of a credit card, the card could also be larger such as to form an informational placard or alternatively could be much smaller such as useful in connection with a key tag or the like.

The adhering or bonding material, if present, that is used to secure the substrates together which may be applied by flood coating, pattern or spot coating, transfer coating or other means known in the industry. The material may be the full length and width of the substrates or may be applied so that the edges of the material extend slightly beyond the pattern of the material laid down. The material used in this invention, refers to tape, adhesive, bonding agents and the like that can be applied to the substrates and used to hold the substrates to one another.

An exemplary tape that may be used in connection with the present invention to bond the webs, sheets or substrates together is an acrylic high performance tape available from Polybond, Corporation of Derry, N.H. and under the product number #114 PET tape. The tape is a polyester (PET) based material to which an acrylic adhesive has been applied. In order to reduce adhesive contamination, the tape is desirably cut using release coated blades on the slitter or other cutting mechanisms. Such release coating includes silicone, Teflon® and the like.

Alternatively, a UV curable material may be deposited in the channel to bond the sheets together.

An exemplary coating that can be applied over the surface of the bonding material as well as used in the channel to bond the substrates together that is suitable for use in connection with the present invention is Sericol® which is available from Sericol of North Kansas City, Kans. and includes acrylate ester, vinyl monomer, acrylated urethane, alkanol amine, barium sulfate and a photoinitator. Sericol® is a pigment less material having an absorbing agent contained therein as well as being in a prescribed pH range. Exemplary Sericol® blends include IJR-701-1"white" and IJR-751-1"matt clear."

The securing or bonding material is over coated with the Sericol® through the use of a blade applicator, Meyer rod, anilox roll or other suitable coating means understood by those skilled in the art. The thickness of the coating ranges from about 0.0001 mil to about 10 mils with about 0.5 to about 1.5 mils being more preferred and about 0.9 to about 1.2 mils being yet still more preferred.

The coating of the present invention is applied generally without dilution but may be diluted such with the inclusion of water. A pH stabilizer and drying/wetting agent may also be added to enhance performance characteristics. Where additives are provided, the range of such additives ranges from about 0.01% to about 20% by weight with the amount of Sericol® ranging from approximately 99.99% to about 80% by weight.

The coating that may be applied over the bonding material of the present invention is preferably UV curable. UV curing is a technology that regularly evolves and efforts are continually sought out in order to achieve improved curing performance so that the printing operation may proceed at optimum speeds. That is, UV curing typically requires a "dwell time" in which the UV curable substance dries before it can be further processed in any additional equipment. As such, it is preferable to achieve faster curing speeds under a variety of difficult and complex environments so as to minimize if not completely eliminate the need for dwell or drying time.

Exemplary bulbs used in curing the coating of the present invention are "H" bulbs and Gallium doped bulb suitable for use in the UV curing processes described herein, however, it should be understood that other UV curing may be used in accordance with the present invention and the present invention is not limited hereto.

The "H" bulb is generally known as a mercury vapor bulb and is used typically for top surface curing applications. The Gallium doped bulb is used in connection with a requirement for penetrating deep within the mix. The UV bulbs such as those described above along with reflectors are available from the GEW Company, located in North Royalton, Ohio. The combination of topical and penetration curing result in a combination of curing energies sufficient to carry out the present invention.

Reference is now directed to FIG. 1 of the presently described exemplary embodiments. FIG. 1 shows a front view of an illustrative construction of a business communication assembly 10 produced in accordance with the present invention. The assembly 10 has first and second portions 12 and 14 and each of the portions has first and second longitudinally extending sides 11, 11*, 13 and 13* and first and second transversely extending edges 15, 15* and 17, 17*, respectively. The first and second portions 12 and 14 abut one another along transversely extending edges 15 and 17 in an area defined by numeral 19. Area 19 is preferably a channel that has been created by ablating a portion of each of the portions 12 and 14 to create a recess. When the two portions abut one another, a channel is formed. A strip of tape or other bonding material is then placed into the channel to hold the first and second portions in an abutting relationship with one another.

FIG. 1 shows that the second portion 14 has been provided with a pair of depressions 20 and 22 that have been created by mechanically ablating a portion of the material of the second portion. Preferably, the ablating is accomplished through use of a mechanical device such as a rotary blade such as a router. Each of the depressions have a size, shape and depth (which will be discussed in connection with FIG. 2) so that removable or detachable elements 24 and 26, such as cards, tags, chips, and the like can be placed within the depressions. The removable elements 24 and 26 will generally be sized and shaped so as to substantially fill the area created by the depressions. The depressions shown in the present FIGURE have substantially equivalent sizes or dimensions so that identical removable elements can be provided to a recipient such as may occur in connection with mailing membership or other identity cards.

As can be seen from the drawing, the depressions generally extend inwardly of the first and second longitudinally extending side and first and second transversely extending edges of the second portion of the assembly. It should be understood that the depressions can be created anywhere in the surface of the first and second portions including adjoining an edge or side.

Also as shown in FIG. 1, personalized information is printed on each of the first and second portions and the removable elements as represented by numeral 28. In addition, the first portion 12 is also provided with static or fixed printing represented by numeral 30. As mentioned previously, personalized printing changes with each form or substrate to create a personalized communication, whereas static information remains fixed on each form that is created in connection with a particular offering. The personalized information 28 that has been provided on each of the first and second portions and removable elements will preferably match so that, once the elements are removed, the remaining portions can continue to serve as record copies of the particular communication that has been produced. That is, the printing will contain common pieces of information that is unique to a particular targeted individual and which can be used for identification and account verification.

The business forms of the present invention may be prepared in an intermediate condition that is, the form may have the depressions created in the form and printed, at least partially with static or fixed information. To complete the assembly, for example, cards would be deposited or placed into the depressions and then the final personalized printing completed.

An exemplary device for ablating the material is available from a number of industrial tool manufacturers such as Vermont American of Mount Prospect, Ill.

The depth of the ablated portion of the form assembly will preferably be equal to the thickness of the element that is to be inserted or placed within the depression created. More preferably, the depression will extend through the first or top surface and run toward the second surface but will not break the second surface. Ideally, the ablation process will create a depression that removes about 90% of thickness of the material with up to about 85% being still more preferred. It should be understood however, that the ablated area may range from about 1% of the thickness of the material to about 99% of the thickness of the material. The depth of the depression will be approximately equal to the thickness of the element to be placed within the depression so that the surface of the removable element and surface of the business communication assembly will be substantially equal or planar with one another.

Figure 2:
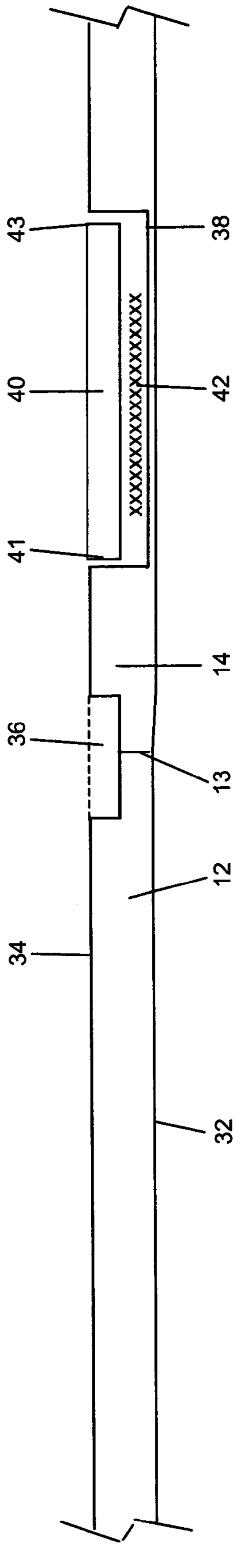
FIG. 2 shows a cross sectional view of the business communication assembly produced in accordance with the present invention.

Turning now to FIG. 2 which shows a cross sectional view of the business form assembly of the present invention. The assembly has top and bottom faces 34 and 32, respectively, which form generally the top and bottom of the assembly. The first and second portions 12 and 14 are again joined in an abutting relationship through use of a channel which is filled with a bonding agent or strip of tape depicted by reference numeral 36. First and second portions 12 and 14 are separated from one another along line 13. As can be seen from the drawings, the second portion 14 is slightly thicker than the first portion 12 which may distinguish two discrete types of materials so that the removable element may more easily be maintained in a substantial planar arrangement with the surface of the assembly.

The depression 38 is shown with a removable element 40 which is held in place at least temporarily by a bonding agent 42. The bonding agent may be an adhesive, such as a rubber based adhesive or alternatively a frangible bonding material which will cause the removable to cleanly separate from the second portion upon breaking of the frangible seal or bond. The strip of tape or removable element will preferably over coated with a print receptive coating, Sericol®, as discussed above so as to eliminate the possibility of print (toner or ink) contaminating other areas of the form assembly.

The removable element 40 will generally be sized and configured to fit within the area of the depression and the end edges 41 and 43 of the removable element 40 will preferably not be in direct contact with the sides of the depression thereby facilitating removal of the element 40.

Figure 3:
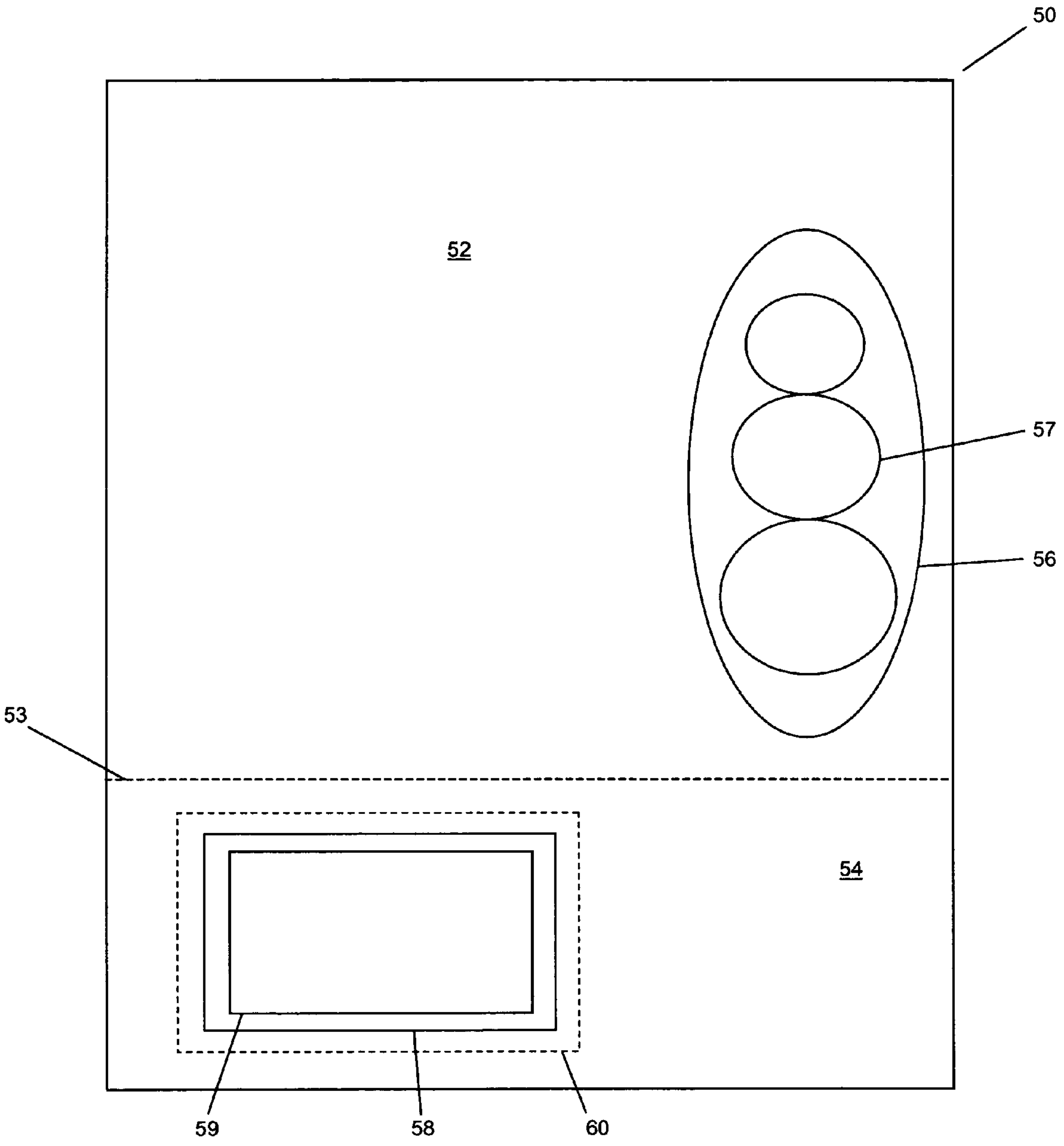
FIG. 3 illustrates a further embodiment of a front view of the business communication assembly produced in accordance with the present invention.

FIG. 3 presents a further alternative configuration of the present invention and includes a business communication substrate 50 having first and second portions 52 and 54. In this embodiment, the first and second portions are constructed of a single sheet of material and are divided by a line of weakness 53 such that the portions may be separated from one another.

The substrate 50 also has first and second depressions 56 and 58 with the first depression appearing in the first portion 52 and the second depression appearing in the second portion 54. One of the depressions 58 is substantially quadrate and includes a substantially quadrate removable element 59 that is substantially sized and configured to fit within the depression. This quadrate shaped depression is provided in the second portion 54 and further includes a line of weakness 60 that extends generally about the periphery of the depression 58. In this way, the depression 58 with the removable element 59 can be removed from the rest of the detachable element carrier.

The first portion 54 of the assembly 50 includes a second depression 56 which includes a distinctly shaped second removable element 57, having the general shape of a snowman. The depression 56 will preferably have a shape that is complimentary to the shape of the element that will be inserted into the depression. It should thus be understood from a review of the FIGURES and description provided herein that various shapes of depressions can be created in the assembly so that variously shaped and sized removable or detachable elements can be placed and carried on the form.

Figure 4:
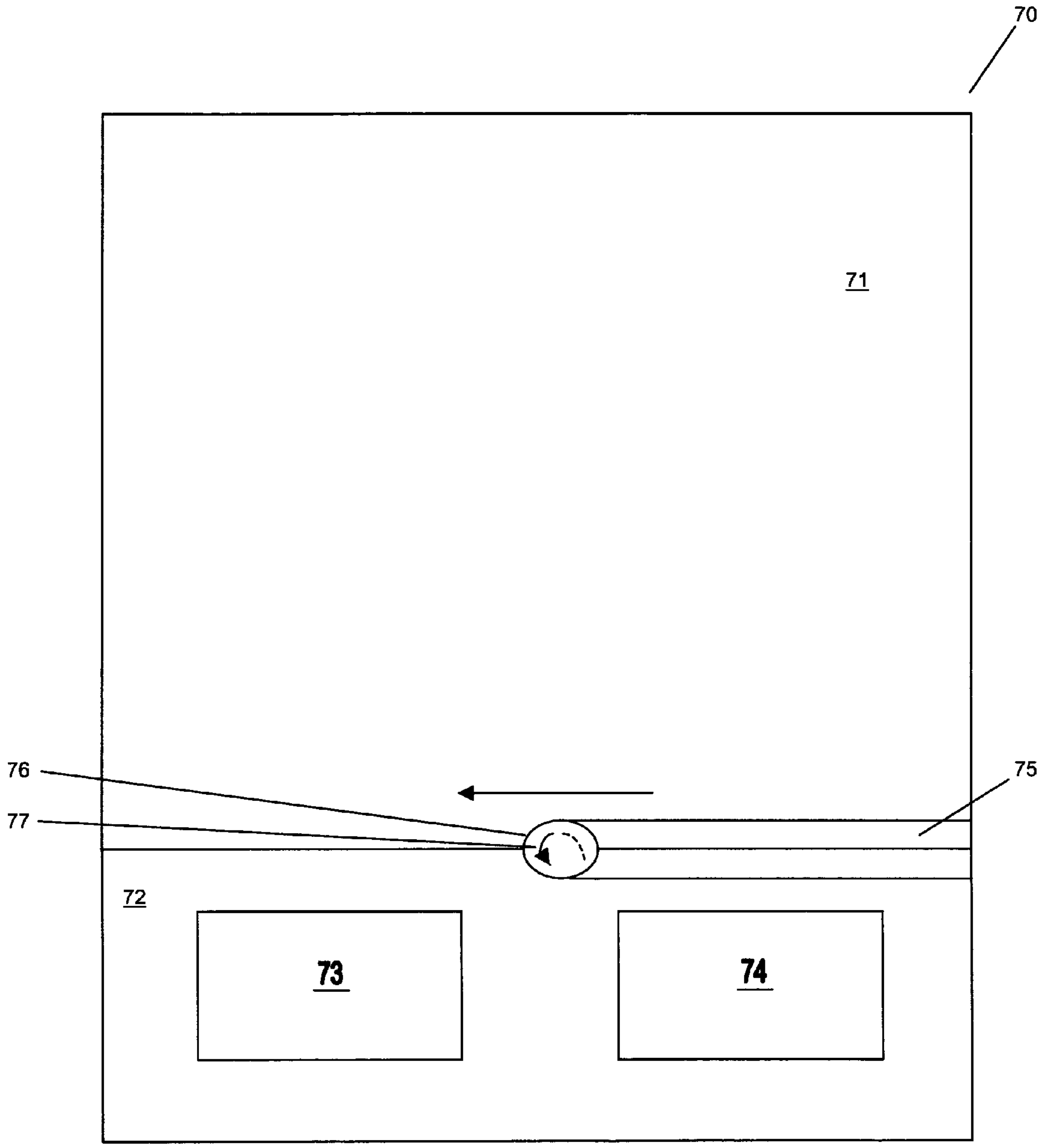
FIG. 4 provides a business form assembly showing the ablation of a portion of the assembly to form a channel.

Turn now to FIG. 4 a business communication assembly 70 is provided and includes first and second discontinuous substrates 71 and 72. The second substrate 72 is provided with a pair of ablated areas 73 and 74. A channel 75 is formed between the first and second substrates 71 and 72 by a mechanical ablating device such as a router, 76 which has a rotary blade or bit depicted in phantom lines 77. The router travels medially between substrates 71 and 72 to create the channel 75 into which a binding strip may be added to hold the assembly together.

By providing an assembly in which quadrate and non-quadrate depressions can be formed, the invention provides a communication assembly that can be used in numerous business and marketing communications thus expanding the scope and use of such assemblies into other areas.

It will thus be seen according to the present invention a highly advantageous business communication produced by mechanical ablation has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

The invention claimed is:

1. A mechanically ablated removable element carrying business communication, comprising:

a) a substrate in the form a substantially planar sheet of printable material having first and second portions, with each of said portions having a thickness, first and second transversely extending edges, first and second longitudinally extending sides and top and bottom faces;

b) said first and second portions being placed in an abutting relationship with one another and secured together along one of said first and second transversely extending edges and first and second longitudinally extending sides;

c) at least one mechanically ablated depression formed in said top face of said second portion and spaced inwardly from each of said first and second transversely extending edges and first and second longitudinally extending sides, said depression having a selected shape and extending from said top face toward said bottom face but without penetrating said bottom face;

d) a removable element sized and configured to fit substantially within said depression and having a shape substantially equivalent to said shape of said depression; and e) a temporary bonding agent disposed within said depression to temporarily hold said removable element in said depression;

f) wherein said removable element has a top surface such that when said removable element is placed within said depression, said top surface of said card is substantially coplanar with said top surface of said second portion.

2. A business communication assembly as recited in claim 1, wherein said temporary bonding agent is a frangible bond.

3. A business communication assembly as recited in claim 1, wherein said temporary bonding agent is a rubber based pressure sensitive adhesive.

4. A business communication assembly as recited in claim 1, wherein said first and second portions each have a recessed transversely extending edge such that when said recessed edges are placed adjacent one another a channel is formed to receive a bonding material.

5. A business communication assembly as recited in claim 1, wherein said depression has a depth substantially equal to the thickness of said removable element and no more than about 85% of said thickness of said substrate.

6. A business communication assembly as recited in claim 1, wherein said substrate includes at least two mechanically ablated depressions in said top face of said second portion.

7. A substantially planar business form assembly and card combination, comprising:

a) a first substantially planar portion having a thickness, first and second transversely extending edges, first and second longitudinally extending sides and top and bottom faces;

b) a second substantially planar portion having a thickness substantially equivalent to said thickness of said first portion, said second portion having first and second transversely extending edges, first and second longitudinally extending sides and top and bottom faces, said second portion being placed in an adjacent, abutting arrangement with said first portion along one of said longitudinally extending sides and transversely extending edges;

c) said first portion and said second portion are joined to one another and cooperate to form a business communication assembly;

d) at least one mechanically ablated, shaped depression formed in said second portion top face and extending from said top face toward said bottom face but not through said bottom face said depression having a shape that is formed by mechanical ablation, said depression having a depth which is less than said thickness of said second portion; and e) a removable card sized and configured to fit substantially within said depression such that a top surface of said card is substantially planar with said top surface of said second portion when said removable card is placed within said depression.

8. A business form and card combination as recited in claim 7, wherein said business form assembly includes at least a second ablated depression formed within one of said first and second portions.

9. A business form and card combination as recited in claim 8, wherein said second ablated depression is substantially equivalent in size to said first ablated depression.

10. A business form and card combination as recited in claim 8, wherein said second ablated depression has a shape that is distinct from said shape of said first depression.

11. A business form and card combination as recited in claim 7, wherein said first ablated depression has a depth that extends up to about 85% of said thickness of said second portion.

12. A business form and card combination as recited in claim 7, wherein said depression is spaced inwardly of said first and second transversely extended edges and said first and second longitudinally extending sides of said second portion.

13. A business form and card combination as recited in claim 7, wherein said depression is provided with a bonding agent to temporarily hold said removable element within said depression.

14. A business form and card combination as recited in claim 7, wherein said second portion has a line of weakness extending substantially around a periphery of said depression.

15. A detachable element carrier for communicating business information, comprising:

a) a business form formed from a substantially planar printable sheet having top and bottom faces, a thickness, first and second transversely extending edges and first and second longitudinally extending sides, said substantially planar business form having two portions, with at least one of said portions having at least one mechanically ablated depression that extends from said top face and toward but not through said bottom face;

b) said ablated depression having a size and a shape and a depth that is less than said thickness of said substantially planar business form, said mechanically ablated depression having a temporary bonding agent deposited within said depression; and c) a detachable element having a size that is less than said size of said depression and a shape that is substantially equal to said shape of said depression, said detachable element further including a top surface and a bottom surface, such that when said detachable element is placed in said depression said top surface of said detachable element will be substantially coplanar with said top surface of said business form.

16. A detachable element carrier as recited in claim 15, wherein said carrier includes at least a second mechanically ablated depression having a size substantially equal to said first depression and a shape substantially equal to said detachable element and each of said first and second depressions are spaced inwardly from said first and second longitudinally extending sides and first and second transversely extending edges.

17. A detachable element carrier as recited in claim 15, wherein said first and second portions are distinct from one another and are joined to one another along one of said first and second transversely extending edges by a strip of tape provided in a recessed channel.

* * * * *